United States Patent
Moore et al.

(10) Patent No.: US 6,252,967 B1
(45) Date of Patent: Jun. 26, 2001

(54) REDUCING ACOUSTIC FEEDBACK WITH DIGITAL MODULATION

(75) Inventors: Kendall G. Moore, Tempe; Samuel L. Thomasson, Gilbert; Richard W. Ulmer, Tempe, all of AZ (US)

(73) Assignee: Acoustic Technologies, Inc., Mesa, AZ (US)

( * ) Notice: Subject to any disclaimer, the term of this patent is extended or adjusted under 35 U.S.C. 154(b) by 0 days.

(21) Appl. No.: 09/234,731

(22) Filed: Jan. 21, 1999

(51) Int. Cl.[7] ............................ H04B 15/00; H04R 29/00
(52) U.S. Cl. .................................. 381/93; 381/83; 381/56
(58) Field of Search .............................. 381/83, 93, 317, 381/318, 66, 56, 58, 59, 82, 96, 108; 379/392, 406, 410, 420

(56) References Cited

U.S. PATENT DOCUMENTS

| | | | |
|---|---|---|---|
| 4,618,987 | * 10/1986 | Steinke et al. | 381/83 |
| 4,747,144 | * 5/1988 | Admiraal et al. | 381/93 |
| 4,783,818 | * 11/1988 | Graupe et al. | 381/83 |
| 4,845,757 | * 7/1989 | Wagner | 381/93 |
| 5,091,952 | * 2/1992 | Williamson et al. | 381/93 |
| 5,412,734 | | 5/1995 | Thomasson | 381/83 |
| 5,506,910 | * 4/1996 | Miller et al. | 381/93 |
| 5,649,019 | | 7/1997 | Thomasson | 381/83 |
| 5,910,994 | * 6/1999 | Lane et al. | 381/83 |
| 6,108,427 | * 8/2000 | Norris et al. | 381/93 |
| 6,111,957 | * 8/2000 | Thomasson | 381/56 |

* cited by examiner

*Primary Examiner*—Xu Mei
(74) *Attorney, Agent, or Firm*—Paul F. Wille

(57) ABSTRACT

Sound is converted into an electrical signal by a microphone and is converted into an inaudible, digitally modulated signal that is combined with the electrical signal from the microphone, amplified, and converted into sound waves by a speaker. Any sound traveling from the speaker back to the microphone includes the inaudible component representing the original sound. The inaudible component is separated from the audible components, and the original sound is reconstructed in a digital demodulator. The reconstructed original sound is subtracted from the signal from the microphone, thereby reducing any echo and canceling feedback. Digital modulation includes any form of shift keying, including coherent and noncoherent techniques for modulating frequency, phase, or amplitude.

15 Claims, 3 Drawing Sheets

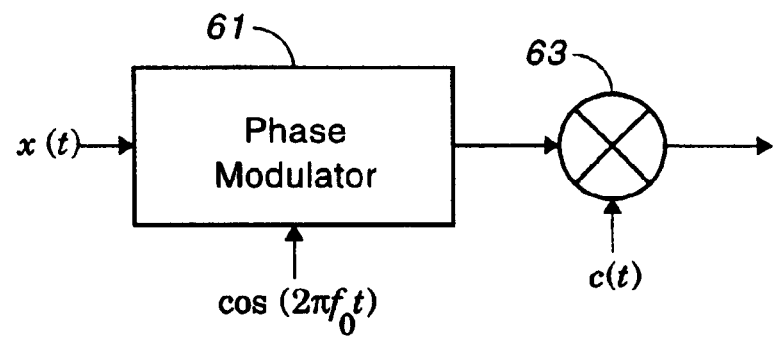
F I G. 4
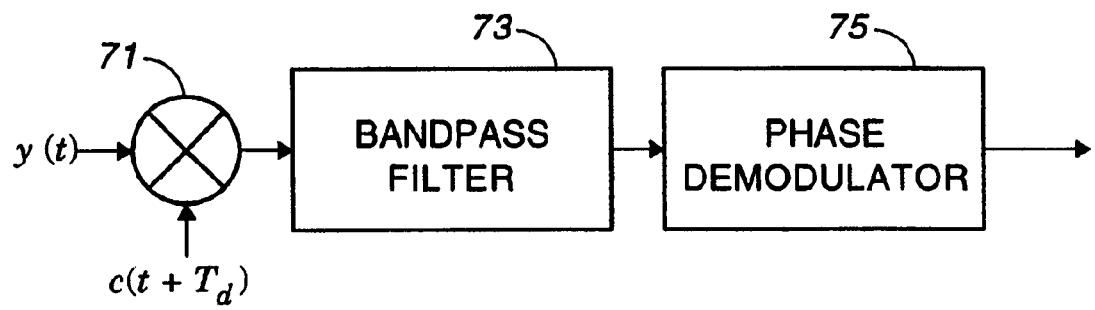
F I G. 5

REDUCING ACOUSTIC FEEDBACK WITH DIGITAL MODULATION

BACKGROUND OF THE INVENTION

This invention relates to circuits for reducing acoustic feedback in electro-acoustic systems such as public address systems, telephones, and hearing aids and, in particular, to reducing feedback by the use of digital modulation.

Sound waves are slight variations in air pressure that a microphone converts into an electrical signal of varying amplitude. In a public address system and other electro-acoustic communications systems, the electrical signal is amplified and converted back into sound waves by one or more speakers.

In theory, a signal passes through a system once, never to return. Outdoors and in well designed auditoriums or concert halls, this is essentially true. In other situations, there can be a significant level of acoustic coupling between the speakers and the microphone, e.g. in a "speaker phone." When the output of an amplifier is coupled to the input of the amplifier, one has feedback, a closed loop with the potential to oscillate.

Acoustic feedback in a public address system can cause a mild echo or a self-sustaining ring, depending upon the loudness of the sound returning to the microphone. The cause of the feedback can be poor placement of a speaker relative to the microphone, walls that reflect sound, and/or simply having the volume set too high on the amplifier.

Speakers and microphones introduce system errors that change with each speaker and microphone used because no two components are actually identical even if the components are the same brand and model. For example, substituting one speaker for another can affect the amplitude and phase of the feedback. Changing the placement of a speaker or of a microphone after a system is calibrated can introduce phase and amplitude errors.

There are two difficulties to eliminating feedback in an acoustic system. One difficulty is determining whether the signal passing through the amplifier is from an echo or from an original sound. A second difficulty is determining the travel time of the echo.

U.S. Pat. No. 5,412,734 (Thomasson) discloses an system for eliminating feedback by tagging the original sound with an inaudible replica of that sound, wherein the replica is a frequency modulated (FM) high frequency carrier. U.S. Pat. No. 5,649,019 (Thomasson) discloses a similar system, wherein the replica is a pulse width modulated (PWM) high frequency carrier. The contents of the Thomasson patents are incorporated herein by reference. FM and PWM are essentially analog operations wherein frequency deviation, or pulse width, is directly related to the amplitude of the original signal.

Although FM and PWM are effective techniques, it is desired to improve the efficiency and effectiveness of echo cancellation using an inaudible acoustic tag. Above 20 kHz, the characteristics of acoustic transducers and of a room change significantly with frequency. However, using a bandwidth of 20–40 kHz can introduce distortions due to the change in characteristics between 20 kHz and 40 kHz. A narrower bandwidth reduces the noise in the system and decreases the power required for successfully tagging or marking the original sound.

The ability to cancel an echo depends, in part, upon the ability to faithfully reproduce the original signal, which generally requires a wider bandwidth rather than a narrower bandwidth. Thus, one has the contrary requirements of narrow bandwidth to reduce systemic errors and a wide bandwidth for greater fidelity.

As used herein, "digital modulation" refers to shift keying modulation techniques that are described by the following equation.

$$x_c(t) = A_1 m_1(t) \text{Cos}\left[2\pi(f_0 + n_1(t) \cdot \Delta f)t + \frac{2\pi(i_1 - 1)}{M} + \varphi_0\right] + \quad (1)$$
$$A_2 m_2(t) \text{Sin}\left[2\pi(f_0 + n_2(t) \cdot \Delta f)t + \frac{2\pi(i_2 - 1)}{M} + \varphi_0\right]$$

Many such techniques are described, in the context of modulated radio frequency (RF) signals, in texts such as "Digital Communications and Spread Spectrum Systems", Ziemer and Peterson, Macmillan Publishing Company, New York, 1985.

In view of the foregoing, it is therefore an object of the invention to provide apparatus for reducing feedback through the use of inaudible digital modulation of an acoustic signal.

A further object of the invention is to provide apparatus for reducing feedback using a narrower bandwidth than for FM or PWM.

Another object of the invention is to provide a apparatus for reducing noise in the returned, marked signal.

A further object of the invention is to provide apparatus for reducing feedback using less power than for FM or PWM.

SUMMARY OF THE INVENTION

The foregoing objects are achieved in the invention wherein sound is converted into an electrical signal by a microphone and the electrical signal is amplified. The electrical signal also is converted into an inaudible, digitally modulated signal that is combined with the signal from the microphone, amplified, and converted into sound waves by a speaker.

Any sound traveling from the speaker back to the microphone includes the inaudible component representing the original sound. The inaudible component is separated from the audible components, and the original sound is reconstructed in a demodulator. The reconstructed original sound is subtracted from the signal from the microphone, thereby reducing any echo and canceling feedback.

Apparatus constructed in accordance with the invention operates more efficiently and can operate with a broader range of acoustic transducers than the apparatus described in the Thomasson patents, without losing any of the advantages.

BRIEF DESCRIPTION OF THE DRAWINGS

A more complete understanding of the invention can be obtained by considering the following detailed description in conjunction with the accompanying drawings, in which:

FIG. 4 is a block diagram of a spread spectrum encoder; and

FIG. 5 is a block diagram of a spread spectrum decoder.

DETAILED DESCRIPTION OF THE INVENTION

Figure 1:
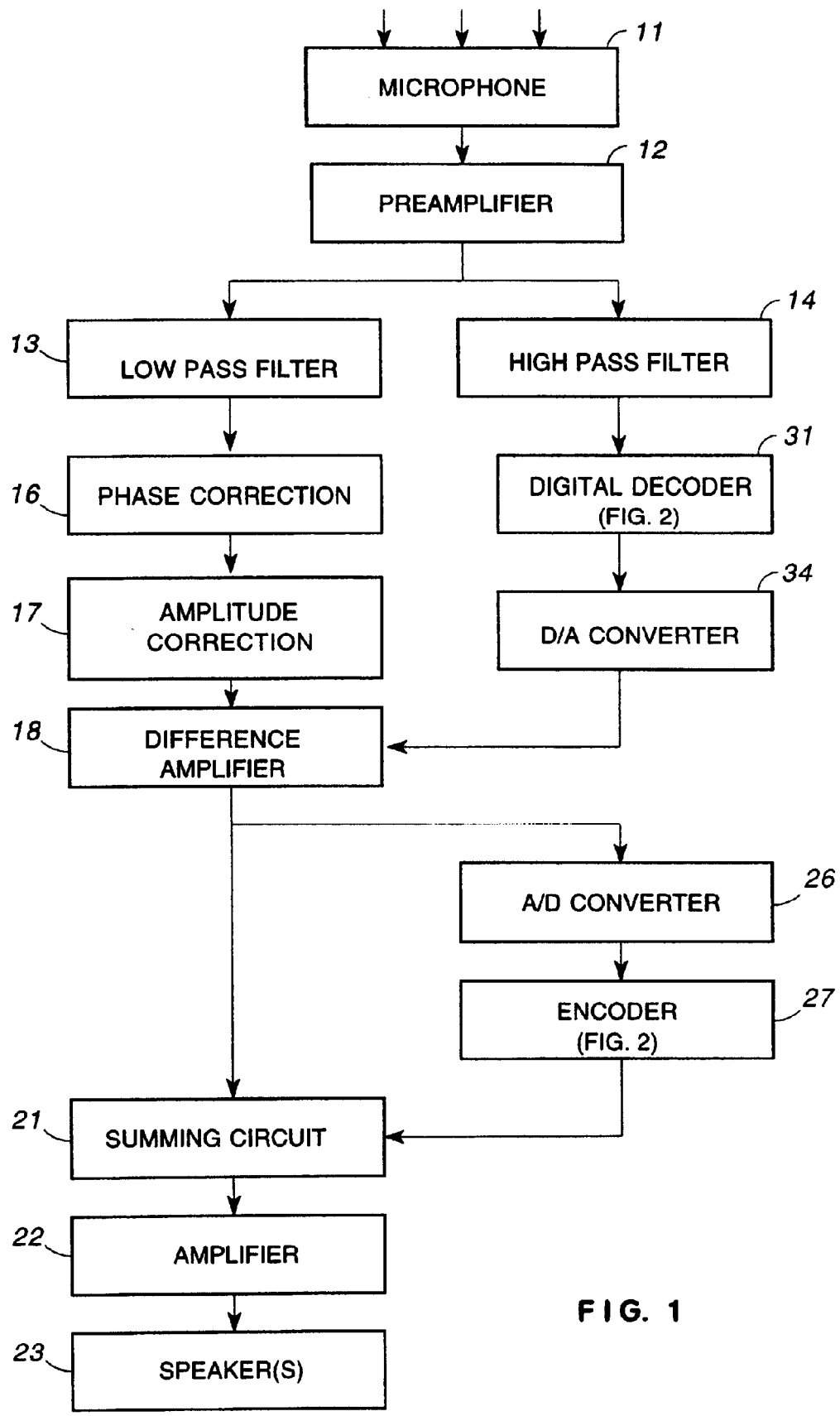
FIG. 1 is a block diagram of a preferred embodiment of the invention.

FIG. 1 illustrates a preferred embodiment of the invention in which a signal representing the original sound is processed digitally to reduce echo. There are three kinds of sound that can strike microphone 11. A first kind is the original sound, a second kind is the audible echo of the original sound, and a third kind is an inaudible acoustic tag for reducing the echo.

The sounds striking microphone 11 are converted into an electrical signal and coupled to preamplifier 12. Preamplifier is coupled to low pass filter 13 and high pass filter 14. The signal representing an original sound travels unaffected from low pass filter 13 down the left-hand side of FIG. 1 through difference amplifier 18 to summing circuit 15. If there is no echo, difference amplifier has no effect upon the signal.

Low pass filter 13 removes the inaudible portion of the sound and the low frequency portion of the sound is coupled to phase correction circuit 16. Circuit 16 eliminates the phase shift introduced by the various other circuits in FIG. 1 and is the time domain analog of amplitude correction circuit 17. Phase correction circuit 16 preferably includes all-pass filters having wide frequency response to minimize frequency dependent, amplitude changes in the signal.

The output signal from phase correction circuit 16 is coupled to amplitude correction circuit 17, which corrects for frequency dependent amplitude variations caused by microphone 11, speakers 23 or other portions of FIG. 1. Amplitude correction circuit 17 has an amplitude vs. frequency characteristic that is the inverse of the remainder of circuit in FIG. 1; i.e., circuit 17 provides a flat frequency response. There are several known techniques by which the inverse characteristic can be obtained.

The output from amplitude correction circuit 17 is coupled to one input of difference amplifier 18. A second input to difference amplifier 18 is coupled to the circuitry for recovering an echo. If there is no echo, difference amplifier 18 simply passes the signal, unaltered, to summing circuit 21. If there is an echo, the echo is subtracted from the signal from circuit 17. Either way, the output from difference amplifier 18 is essentially only the original sound detected by microphone 11.

The signal from difference amplifier 18 is coupled as one input to summing circuit 21 and to A/D converter 26, which converts the signal to a series of digital pulses representative of the signal. For example, converter 26 includes circuitry, known per se in the art, for sampling the incoming signal and providing a digital data representative of the amplitude of each sample. A typical sampling rate twenty kilohertz.

The data from converter 26 is coupled to encoder 27, which converts the data into an inaudible, digitally modulated signal. Thus, converter 26 and encoder 27 are a digital modulator producing a signal having a center frequency greater than about 20 kHz. This signal is combined in summing circuit 21 with a signal from amplifier 18 and broadcast by way of amplifier 22 and speakers 23.

When a signal is received with an echo, and the inaudible replica of the original signal, high pass filter 14 removes the low frequency or audible portion of the signal from preamplifier 12 and couples the remainder to digital decoder 31. Digital decoder 31 converts the incoming signal into a digital value having a predetermined number of bits. In one embodiment of the invention, the output from digital decoder 31 included six bits. The number of bits can be greater or less than six, although increasing the number of bits increases the bandwidth of the signal. If the bandwidth of the inaudible portion of the signal increases beyond 35–40 kilohertz, then custom speakers and microphones must be used instead of commercial grade speakers and microphones.

The six-bit digital signal from decoder 31 is applied to digital to analog (D/A) converter 34. Decoder 31 and converter 34 are a digital demodulator for recovering the original signal from the inaudible modulation. The analog signal from converter 34 is a reconstruction of the earlier original sound and is coupled to one input of difference amplifier 18. The other input to difference amplifier 18 is connected to the amplitude correction circuit 17 that receives the audible signal. Difference amplifier 18 subtracts the reconstructed echo from the audible portion of the sound detected by microphone 11, thereby reducing or eliminating any echo.

In accordance with the invention, shift keying techniques are used to produce the inaudible replica of the original sound, thereby reducing bandwidth requirements and reducing the power needed to produce a satisfactory inaudible replica. Shift keying techniques utilize step changes in phase, frequency, or amplitude for encoding data. Such techniques include frequency shift keying (FSK), biphase shift keying (BPSK), and amplitude shift keying (ASK) as a first group; quadrature phase shift keying (QPSK), offset quadrature phase shift keying (OQPSK), minimum shift keying (MSK), and quadrature amplitude modulation (QAM) as a second group; and noncoherent frequency shift keying (NFSK) and differentially coherent phase shift keying (DPSK) as a third group.

In a preferred embodiment of the invention, quadrature phase shift keying (QPSK) is used for modulating an inaudible carrier. QPSK is described as follows.

$$x_c(t) = A_1 m_1(t) \text{Cos}[2\pi f_0 t + \Phi_0] + A_1 m_2(t) \text{Sin}[2\pi f_0 t + \Phi_0] \qquad (2)$$

By comparison with equation (1), it can be seen that equation (2) is obtained from equation (1) as follows.

$$n_1(t) = n_2(t) = 0$$

$$i_1 = i_2 = 1$$

$$A_1 = A_2 \qquad (3)$$

In equation (2), $m_1$ and $m_2$ are two bit streams obtained from converter 26. The bit streams are modulated on carriers phase shifted 90° relative to each other and $m_1$ and $m_2$ change sign in synchronism. If $m_1$ and $m_2$ change sign at times that are offset by one half the sampling period ($T_{s/2}$), then the modulation is known as offset QPSK (OQPSK). Using two data streams increases the number of bits that can be encoded per second without increasing the bandwidth of the system. The data is preferably separated into even and odd bits for generating the two data streams. Other separation schemes could be used instead.

Figure 2:
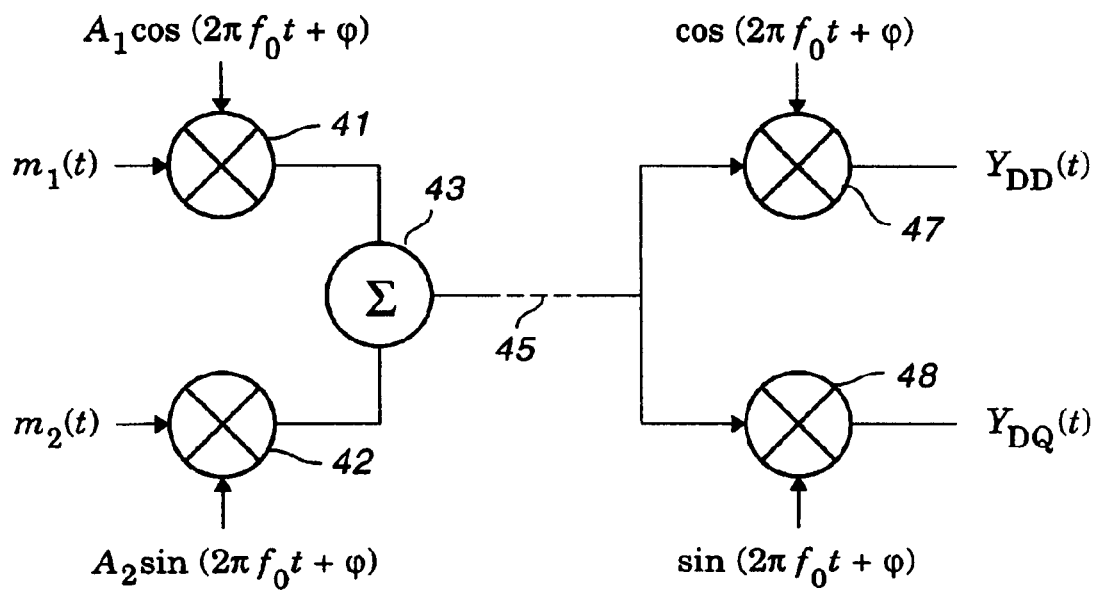
FIG. 2 is a block diagram of an encoder and decoder used in the invention.

FIG. 2 illustrates a modulator and a demodulator for QPSK signals. Modulator 41 receives data stream mil and modulates on a carrier having frequency $f_0$, e.g. 25 kHz. Modulator 42 receives data stream $m_2$ and modulates the quadrature carrier. The quadrature signals are combined in summation circuit 43 and coupled to summation circuit 21 (FIG. 1) for combining with the audible signal.

Dashed line 45 represents the electro-acoustic path including summing circuit 21 (FIG. 1), speakers 23, the air, microphone 11, and high pass filter 14. The received signal is coupled to demodulator 47, to which the carrier is also applied, and to demodulator 48, to which the quadrature carrier is also applied. The recovered data streams are then recombined and coupled to D/A converter 34 (FIG. 1).

QPSK/OQPSK provides several advantages over FM or PWM, including reduced power, narrower bandwidth, and better immunity to noise. Other forms of digital modulation provide similar results. For example, in an alternative embodiment of the invention, minimum shift keying (MSK) is used. MSK can be considered a special case of QPSK, described by equations (4) as $$m_1(t)=a_1(t)\cos(2\pi f_1 t)$$
$$m_2(t)=_2(t)\sin(2\pi f_1 t) \quad (4)$$

wherein $a_1(t)$ and $a_2(t)$ are ±1 binary valued signals whose signs may change every $T_s$ seconds with the times offset by $T_{s/2}$ and $f_1$ is the frequency of the bits. The apparatus for modulating and demodulating these signals is illustrated in FIG. 2.

The foregoing modulation techniques require quadrature carrier signals. Non-quadrature modulation can be used instead, such as FSK, BPSK, or ASK. For FSK, $$x_c(t)=A_1\text{Cos}[2\pi(f_0+n_1(t)\cdot\Delta f)t+\Phi_0] \quad (5)$$

which is obtained by setting $$i_i=i_2=m_1(t)=1m_2(t)=0 \quad (6)$$

and $n_1(t)$ represents the bit stream with $n_2(t)=0$. Either the sine portion or the cosine portion of equation (1) could be used to represent FSK.

Figure 3:
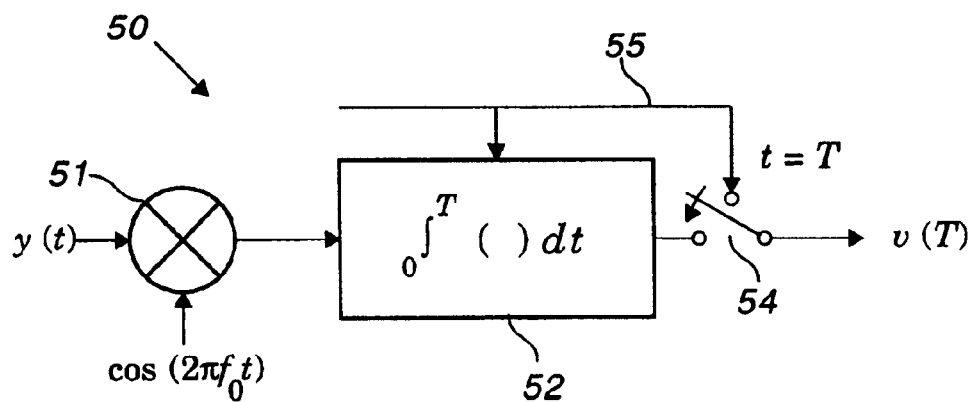
FIG. 3 is a block diagram of a decoder used in the invention.

FIG. 3 illustrates a suitable decoding circuit for FSK. Specifically, decoder 50 includes demodulator 51, integration circuit 52, and sampling circuit 54. Line 55 provides a synchronizing signal for controlling both integration and sampling. After each sample, the integrator is set to zero and the process is repeated for the next bit. The apparatus in FIG. 3 is known as coherent demodulation followed by integrate and dump detection.

The apparatus illustrated in FIGS. 2 and 3 use coherent demodulation for detecting the echo, which enables one to simplify implementing the invention. The invention can be implemented using noncoherent demodulation, if desired, such as noncoherent frequency shift keying (NFSK), differentially coherent, phase shift keying (DPSK), continuous phase modulation (CPM), and spread spectrum modulation. Although such circuitry is more complex and more expensive, the circuitry is also better suited to environments producing many echoes, i.e. many returns with various phases, and to spread spectrum or frequency hopping techniques.

Spread spectrum modulation may seem contrary to the desire to reduce bandwidth because the frequency separation increases the bandwidth required and seems to require specially designed microphones and speakers. On the contrary, and in accordance with another aspect of the invention, it has been found that spread spectrum is particularly useful in noisy environments or where several echo cancelling circuits may become acoustically coupled.

In accordance with the invention, the center frequency is preferably above twenty kilohertz but the bandwidth extends downward, well into the audible spectrum; e.g. down to twelve kilohertz. A spread spectrum audio signal sounds somewhat like interstation hiss on an FM radio. By keeping only a portion of the signal in the audible range, only a portion of the signal is audible and the slight increase in audible noise is not objectionable.

FIG. 4 illustrates an encoder for producing a spread spectrum signal. The particular circuit illustrated in FIG. 4 employs binary phase shift keying (BPSK) as the spreading modulation on a BPSK signal. Other combinations, including quadrature signals, could be used instead. The binary data is applied as one input to phase modulator 61 and the carrier frequency is applied to another input of the modulator. The output from modulator 61 is coupled as one input to multiplier 63. The other input to multiplier 63 is a signal representing the spreading function c(t), which takes the values ±1; representing an instantaneous phase change of 180°. The output from multiplier 63 is coupled to summation circuit 21 (FIG. 1).

FIG. 5 illustrates a suitable decoder for spread spectrum signals. The signal received from high pass filter 14 (FIG. 1) is coupled as one input to multiplier 71. Another input to multiplier 71 is a signal representing the delayed spreading function, $c(t+T_d)$, where $T_d$ is the decoder's best estimate of the propagation delay. The delayed spreading function is preferably derived directly from the spreading function and locked in a phase locked loop.

The output of multiplier 71 is coupled through bandpass filter 73 to phase demodulator 75, where the original data is recovered, e.g. using the circuit illustrated in FIG. 3. The output from demodulator 75 is coupled to D/A converter 34 (FIG. 1). =The invention thus provides apparatus for reducing feedback through the use of inaudible digital modulation of an acoustic signal. The apparatus for reducing feedback uses a narrower bandwidth than for FM or PWM, requiring less power than for FM or PWM. Noise is reduced in the returned, marked signal because the noise does not correlate with the shifting signal.

Having thus described the invention it will be apparent to those of skilled in the art that various modifications can be made within the scope of the invention. For example, the digital portions of the apparatus can be implemented in a microprocessor, in a single custom digital integrated circuit (ASIC), or in a single programmed logic array (PLA). The number of bits per word can be changed to suit a particular application. Digital modulation or shift key modulation, other than the ones specifically described, can be used for implementing the invention.

What is claimed as the invention is:

1. A method for reducing acoustic feedback, said method comprising the steps of:

projecting a composite acoustic signal having a baseband audio component and a digitally modulated component;

sensing said composite acoustic signal and converting said composite acoustic signal into an electrical signal having a baseband audio component and a modulated component;

separating said baseband audio component from said modulated component;

producing a reconstructed baseband audio component from said modulated component; and subtracting said reconstructed baseband audio component from said baseband audio component.

2. The method as set forth in claim 1 wherein said projecting step comprises the steps of:

converting a sound into a baseband audio signal;

converting said baseband audio signal into a digitally modulated signal;

combining said baseband audio signal and said digitally modulated signal to produce a composite signal; and coupling said composite signal to at least one loudspeaker.

3. The method as set forth in claim 2 wherein said digitally modulated signal has a center frequency equal to or greater than 20 kHz.

4. The method as set forth in claim 2 wherein said digitally modulated signal is modulated by quadrature phase shift keying.

5. The method as set forth in claim 2 wherein said digitally modulated signal is modulated by minimum shift keying.

6. The method as set forth in claim 2 wherein said digitally modulated signal is modulated by frequency shift keying.

7. The method as set forth in claim 2 wherein said digitally modulated signal is modulated to produce a spread spectrum.

8. Apparatus for producing an audible signal having inaudible modulation, said apparatus comprising:

a digital encoder having an input having an input adapted to receive a baseband audio signal and an output, said digital encoder producing an output signal having an ultrasonic fundamental frequency; and a first summing circuit having an output, a first input coupled to the input of said digital encoder, and a second input coupled to the output of said digital encoder;

wherein said digital encoder includes:

a first modulator having a first input for receiving a first bit stream, a second input for receiving a first carrier signal, and an output;

a second modulator having a first input for receiving a second bit stream, a second input for receiving a second carrier signal, and an output;

a second summing circuit having a first input coupled to the output of said first modulator, a second input coupled to the output of said second modulator, and an output;

wherein the output of the second summing circuit is coupled to the first input of said first summing circuit and wherein the first carrier signal is phase displaced from the second carrier signal by 90°.

9. The apparatus as set forth in claim 8 wherein said first modulator and the second modulator step-wise shift frequency to modulate a carrier.

10. The apparatus as set forth in claim 8 wherein said first modulator and the second modulator step-wise shift phase to modulate a carrier.

11. The apparatus as set forth in claim 8 wherein said first modulator and the second modulator step-wise shift amplitude to modulate a carrier.

12. Apparatus for producing an audible signal having inaudible modulation, said apparatus comprising:

a digital encoder having an input having an input adapted to receive a baseband audio signal and an output, said digital encoder producing an output signal having an ultrasonic fundamental frequency; and a first summing circuit having an output, a first input coupled to the input of said digital encoder, and a second put coupled to the output of said digital encoder;

wherein said digital encoder includes:

a modulator having a first input for receiving a bit stream, a second input for receiving a carrier signal, and an output, wherein said modulator step-wise shifts frequency to modulate said carrier signal.

13. Apparatus for producing an audible signal having inaudible modulation, said apparatus comprising:

a digital encoder having a input having an input adapted to receive a baseband audio signal and an output, said digital encoder producing an output signal having an ultrasonic fundamental frequency; and a first summing circuit having an output, a first input coupled to the input of said digital encoder, and a second input coupled to the output of said digital encoder;

wherein said digital encoder includes:

a modulator having a first input for receiving a bit stream, a second input for receiving a carrier signal, and an output, wherein said modulator step-wise shifts phase to modulate said carrier signal.

14. Apparatus for producing an audible signal having inaudible modulation, said apparatus comprising:

a digital encoder having an input having a input adapted to receive a baseband audio signal and an output, said digital encoder producing an output signal having an ultrasonic fundamental frequency; and a first summing circuit having an output, a first input coupled to the input of said digital encoder, and a second input coupled to the output of said digital encoder;

wherein said digital encoder includes:

a modulator having a first input for receiving a bit stream, a second input for receiving a carrier signal, and an output, wherein said modulator step-wise shifts amplitude to modulate said carrier signal.

15. A method for canceling acoustic feedback of an original sound, said acoustic feedback having an audible part and an inaudible part, said method comprising the steps of:

projecting said original sound and an inaudible signal digitally modulated by said original sound;

reconstructing said original sound from said inaudible, digitally modulated part of said acoustic feedback; and subtracting the reconstructed original sound from the audible part of said acoustic feedback.

* * * * *